S. W. CARTER.
RANGE FINDING SIGHT.
APPLICATION FILED APR. 13, 1909.
951,523.
Patented Mar. 8, 1910.
3 SHEETS—SHEET 1.
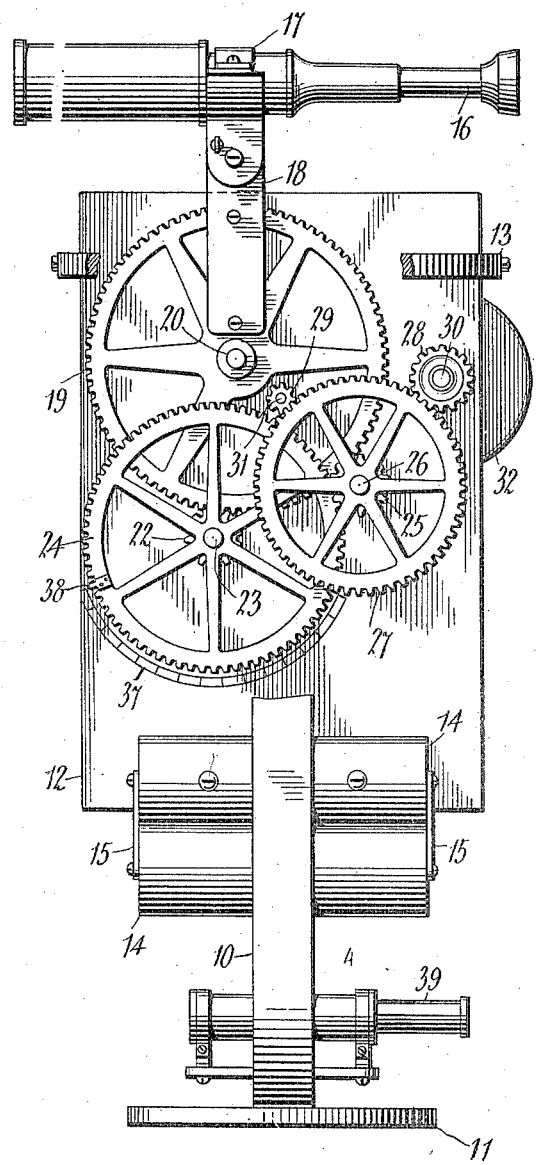
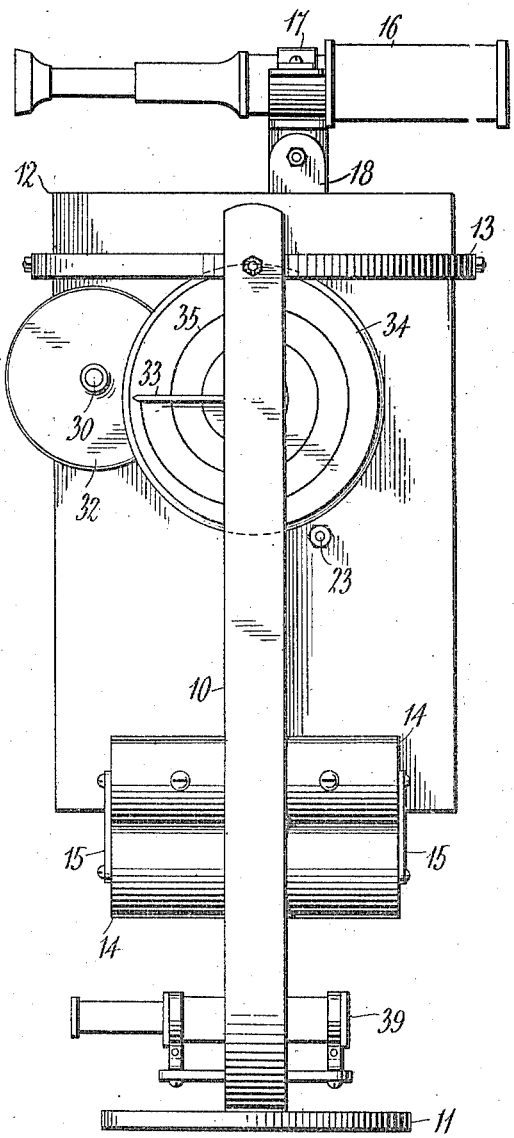
Witnesses
Inventor
Samuel W. Carter
By
Attorneys

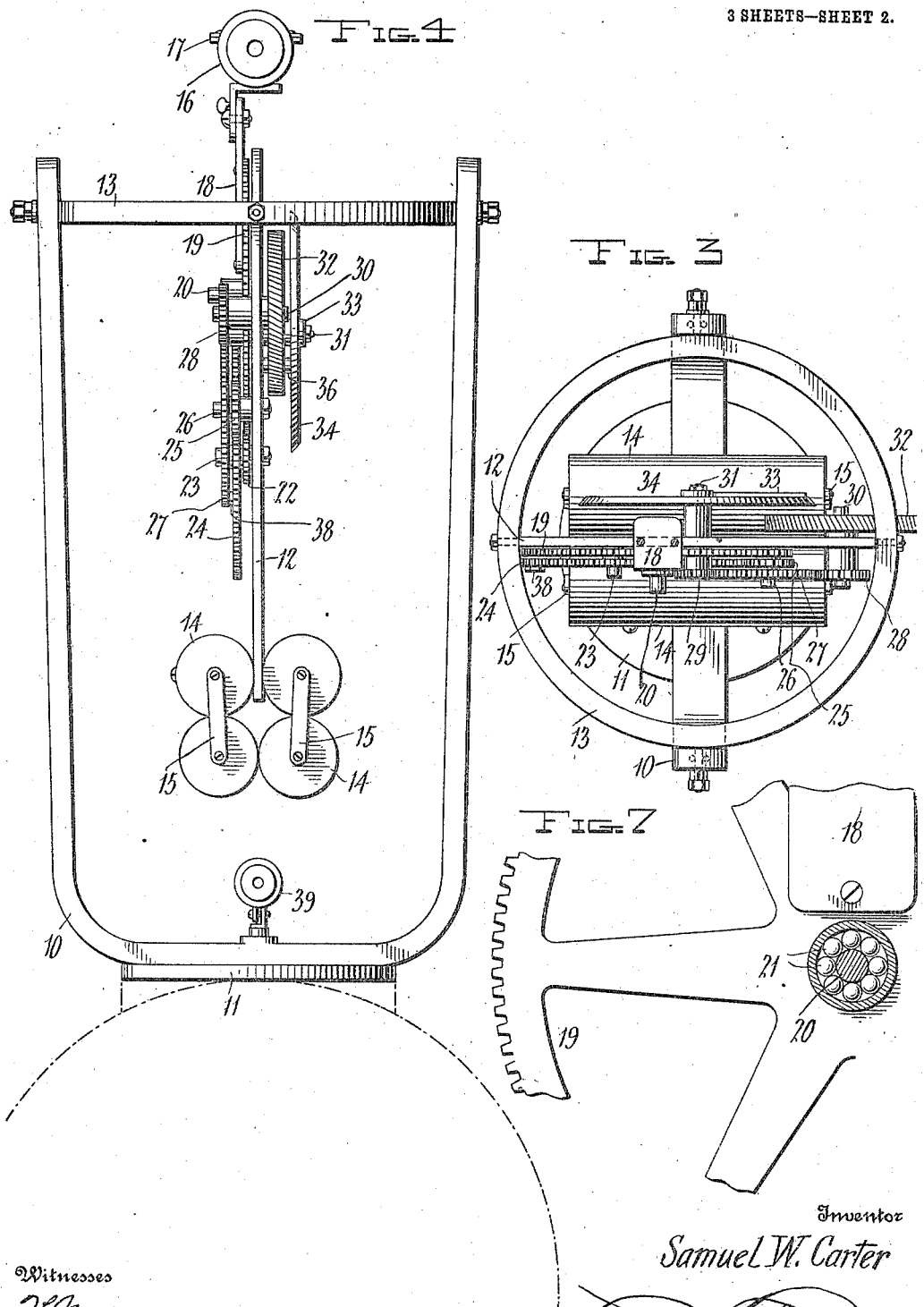

S. W. CARTER.
RANGE FINDING SIGHT.
APPLICATION FILED APR. 13, 1909.
951,523.
Patented Mar. 8, 1910.
3 SHEETS—SHEET 3.
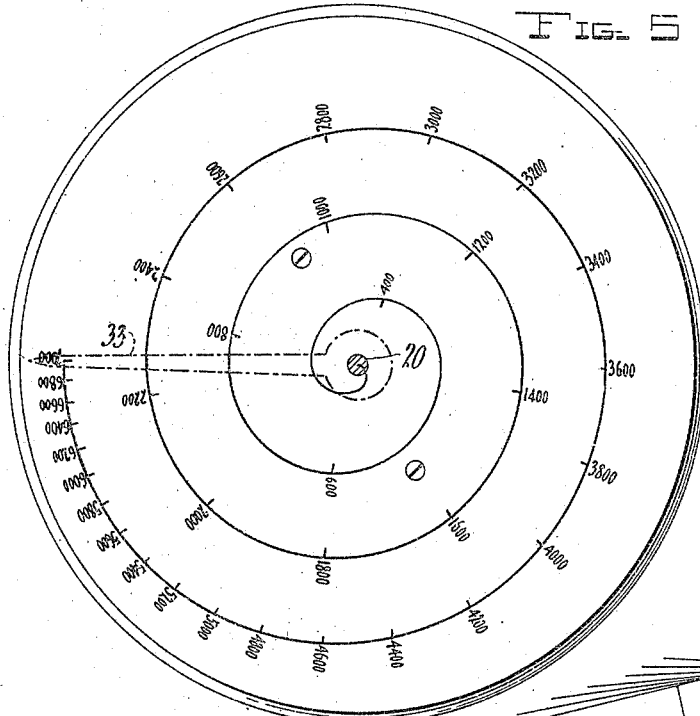
Witnesses
Inventor
Samuel W. Carter
By
Attorneys

UNITED STATES PATENT OFFICE.

SAMUEL W. CARTER, OF WASHINGTON, DISTRICT OF COLUMBIA.

RANGE-FINDING SIGHT.

951,523.

Specification of Letters Patent.   Patented Mar. 8, 1910.

Application filed April 13, 1909. Serial No. 489,611.

*To all whom it may concern:*

Be it known that I, SAMUEL W. CARTER, a citizen of the United States, residing at Washington, in the District of Columbia, have invented certain new and useful Improvements in Range-Finding Sights; and I do hereby declare the following to be a full, clear, and exact description of the invention, such as will enable others skilled in the art to which it appertains to make and use the same.

The present invention relates to improvements in range finding sights, and it has for its general object the production of an instrument of the type specified designed for direct attachment to the heavy ordnance with which a battleship or sea coast fort is provided, the construction being such as to permit the position of a distant object to be readily and accurately determined during the time that the gun is actually being trained upon said object, to determine its direction, thus dispensing with the necessity for the use of a separate instrument located in the fighting top of the vessel or at some superelevated point upon the parapet of the fort, and for the employment of telephonic or other means of communication between the fighting top (or superelevated point), the chart room, and the gun turret, (or its equivalent).

Briefly described, this instrument comprises a weighted plate supported upon gimbals and carrying a sighting telescope and dial, the latter having a spiral scale marked thereon. The telescope is mounted upon an arm disposed radially of a gear secured to the above mentioned plates, and as this gear is turned in either direction by means of the gear connections between it and the adjusting wheel, the line of collimation, *i. e.*, the optical axis of the telescope, forms a traveling tangent to the arc described by the point of intersection of said line and the center line of said arm.

The instrument further comprises what may be regarded as two separate trains of gears, a reducing train, which operates the telescope and includes the gear above referred to, and an increasing train, which operates the pointer mounted upon the dial.

The preferred embodiment of the invention is illustrated in the accompanying drawings, wherein, Figure 1 is a side elevation of the instrument, part of the supporting frame being broken away. Fig. 2 is a similar view taken from the opposite side. Fig. 3 is a plan view. Fig. 4 is a rear elevation. Fig. 5 is an enlarged detail view of the main scale. Fig. 6 is an enlarged fragmental detail view of the supplemental scale. Fig. 7 is a detail view, partly in section, illustrating the manner in which the telescope carrying arm is mounted. Fig. 8 is a diagrammatic view illustrative of the movement of the telescope.

Reference being had to said drawings, and to the numerals marked thereon, 10 designates a U-shaped frame mounted upon a ring 11, the latter being mounted, in turn, directly upon the gun. Between the arms of this frame is located a vertical plate 12 carried by a gimbal ring 13, which is pivotally connected to the edges of the plate adjacent the upper ends thereof, the ring itself being pivotally attached in the usual manner to the upper ends of the frame arms. The plate, which is arranged at right angles to the plane of said arms, is thus capable of a rocking movement both sidewise, forward and backward, as will be understood, to accommodate itself to the motion of the ship, the upper and lower edges of the plate being maintained in horizontal position at all times by means of a series of weights 14, in the present instance four connected to its lower end, there being two of these weights upon each side of the plate. The lower weight of each pair is preferably pivotally connected to the upper weight thereof by a pair of metal straps 15.

Above the upper edge of the plate is mounted the sighting telescope 16. This telescope is attached by means of a clamp 17 to the upper end of an arm 18 secured to and disposed radially of a relatively large gear 19 rotatably mounted upon a short horizontal pin or stub shaft 20, which projects laterally from and is secured to said plate, there being a series of anti-friction rollers 21 interposed between said pin and the hub of said gear. The teeth of this gear mesh with those of a smaller gear 22 mounted in a similar manner upon a pin 23, which is likewise set into the plate. Gear 22 is formed upon the hub of a larger gear 24, which meshes, in turn, with a smaller gear 25 similarly mounted upon a pin 26, the latter being located below and to the rear of pin 20, while the second pin 23 is located below and slightly in advance of the pin first mentioned.

Gear 25 is formed upon the hub of a large gear 27 which meshes with a pair of gears 28 and 29 mounted respectively upon short horizontal shafts 30 and 31. These shafts are journaled in bushings which fit in openings formed in plate 12. Referring to Fig. 4, shaft 30, to the left hand end of which the gear 28 is secured, carries upon its right hand end the milled hand wheel 32 by which the entire system of gears above described is operated, said wheel having a diameter sufficiently great to enable it to project beyond the rear vertical edge of the plate.

Shaft 31 has rigidly attached to its right hand end an indicator 33 arranged to travel around the dial plate 34 upon which the spiral major scale 35 is marked in any suitable manner, the plate just referred to being formed with an axial opening through which the indicator shaft passes. Said plate however, is carried by a short arm 36, which projects laterally from the right hand face of the swinging plate 13.

The relative diameters of the various gears above described are such that said gears may be regarded as forming two separate trains, viz: a reducing train, which includes the gears 28, 27, 25, 24, 22 and 19, and an increasing train, which comprises the gears 28, 27 and 29. The train first mentioned effects the swinging movements of the telescope, while the second named train effects the rotation of the indicator. Thus it will be apparent that the latter makes several complete revolutions during the time that the telescope is moved through a small arc.

With reference to the telescope, it is to be noted that the central line of the arm 18, to which it is secured, is perpendicular to its optical axis, generally termed the "line of collimation." Hence, the arc above referred to is described by the point of intersection between said line of collimation and said central line, and the former line is thus a traveling tangent to said arc.

The dial plate, as above stated, carries the major scale 35. This scale may be printed upon a card attached to the dial plate in any suitable manner, or the outer face of the plate may be grooved, according as preferred. In either case, the marking is in the form of a continuous spiral, graduated from 400 to 7,000 yards, reading from the center outward, the measurements being obtained by dead reckoning. In conjunction with this main scale, there is employed a supplemental scale 37 which is located upon the left hand face of the swinging plate 12, and is in the form of an arc concentric with the gear 24. This arc is preferably divided into fifteen parts, the readings being taken therefrom by a short indicator 38 with which said gear is provided, the scale being sufficiently close thereto to admit of this being accomplished. It may be stated in this connection that the main scale presents a definite number of convolutions, all of which are intersected by the indicator. These convolutions are graduated from 400 to 7,000 yards, as stated, the distance between any two adjacent division lines corresponding to an actual distance of 200 yards, there being in all, thirty-four divisions. Owing to the provision of the two trains of gears, it will be apparent that during the time that the telescope swings through an arc sufficient to enable it to sight an object (the battleship or other target) 7,000 yards distant, the main indicator will have made a definite number of complete revolutions, in which instance, the reading is taken from the outermost spiral, as will be understood. For distances intermediate the two limits specified, it becomes essential to accurately determine the proper convolution from which to take the reading. To accomplish this, the supplemental scale 37 is employed and the divisions of this supplemental scale are each so long that the supplemental indicator 38 will move from one division line to the next division line while the main indicating finger 33 is making one complete revolution on the main dial. The points on the supplemental dial 37 are numbered consecutively as illustrated, and hence by noting the number of the points of the supplemental scale last passed by the supplemental finger 38, there will be found the number of the convolution for the proper reading of the main dial, it being understood that the convolutions of the main dial are counted from the center outwardly.

The U-shaped frame 10 between whose arms the swinging plate is located, may be provided if desired, with a secondary or stationary telescope 39, which is mounted upon the base portion thereof, and is positioned exactly parallel with the axis of the gun.

The instrument, as originally stated, is designed for use upon battleships and sea coast forts, and in either instance is mounted directly upon the gun, the latter and the telescope having their axes exactly parallel.

In operating the instrument the gun is trained upon the distant target, i.e., the hostile vessel by shifting the gun in the usual manner until the vertical cross-hair of the telescope 16 bears upon some determinative point of said vessel, thus determining the direction thereof. The milled operating wheel 32 is then turned in the proper direction until the horizontal cross-hair bears upon the water line of the vessel, whereupon the range may be determined from the two scales, as above described. The gun is then elevated to correspond with the range. It will therefore be apparent that the operation of sighting the gun may be accomplished wholly by the guncrew without the necessity for telephonic or other communication with the chart room, thus avoiding the delay and the possibility of erroneous transmission ordinarily consequent upon such communication.

What is claimed, is:—

1. A range-finding sight comprising a vertically arranged, gimbal supported plate; an arm pivoted to said plate and arranged to swing in a plane parallel to that of the plate; and a telescope mounted upon said arm, the line of collimation of the telescope being a traveling tangent to the arc described by the intersection of said line of collimation and the center line of said arm.

2. A range-finding sight comprising a plate; a pivotally mounted telescope; a dial, and an indicator movable around the same; a train of increasing gears for rotating said indicator; a train of decreasing gears for swinging said telescope, the movements of the latter having a predetermined relation to those of the indicator; and a common means for operating both trains.

3. A range-finding sight comprising a plate; an increasing and a decreasing train of gears carried thereby; a radially disposed arm secured to a gear of the second named train; a telescope mounted upon said arm, the line of collimation of the telescope being a traveling tangent to the arc described by the intersection of said line of collimation and the center line of said arm; a dial attached to said plate; an indicator secured to the shaft of one of the gears of the first named train and arranged to travel around the dial, the movements of said indicator having a predetermined relation to those of said telescope; and a common means for operating both trains.

4. A range-finding sight comprising a vertically arranged, gimbal supported plate; an increasing and a decreasing train of gears carried thereby; a radially disposed arm secured to a gear of the second named train; a telescope mounted upon said arm, the line of collimation of the telescope being a traveling tangent to the arc described by the intersection of said line of collimation and the center line of said arm; a dial attached to said plate; an indicator secured to the shaft of one of the gears of the first named train and arranged to travel around the dial, the movements of said indicator having a predetermined relation to those of said telescope; and a common means for operating both trains.

5. A range-finding sight comprising a plate; a pivotally mounted telescope; a main scale; a rotary indicator coöperating therewith; a train of increasing gears for rotating said indicator; a train of decreasing gears for swinging said telescope, the movements of the latter having a predetermined relation to those of the indicator; a supplemental scale; and an indicator carried by one of said decreasing gears for coöperating with the second scale, the graduations of said second scale having a predetermined relation to those of the first scale.

6. A range-finding sight comprising a plate; a pivotally mounted telescope; a main scale having a graduated continuous spiral marked thereon; a rotary indicator coöperating therewith; a train of increasing gears for rotating said indicator; a train of decreasing gears for swinging said telescope, the movements of the latter having a predetermined relation to those of the indicator; a supplemental scale; and an indicator carried by one of said decreasing gears for coöperating with the second scale, the graduations of said second scale having a predetermined relation to the number of revolutions made by the main indicator, and to the number of convolutions of the main scale.

7. A range-finding sight comprising a plate; an increasing and a decreasing train of gears carried thereby; a radially disposed arm secured to a gear of the second named train; a telescope mounted upon said arm, the line of collimation of the telescope being a traveling tangent to the arc described by the intersection of said line of collimation and the center line of said arm; a main scale; a rotary indicator secured to the shaft of one of the gears of the first mentioned train for coöperation with said scale, the movements of said indicator having a predetermined relation to those of said telescope; a supplemental scale; and an indicator carried by one of said decreasing gears, for coöperating with said second scale, the graduations of said second scale having a predetermined relation to those of the first scale.

In testimony whereof, I affix my signature, in presence of two witnesses.

SAMUEL W. CARTER.

Witnesses:
  WM. W. SHIPLEY,
  L. B. JAMES.